United States Patent
Sobhany

(10) Patent No.: US 10,967,873 B2
(45) Date of Patent: Apr. 6, 2021

(54) SYSTEMS AND METHODS FOR VERIFYING AND MONITORING DRIVER PHYSICAL ATTENTION

(71) Applicant: Cobalt Industries Inc., San Francisco, CA (US)

(72) Inventor: Rana June Sobhany, Lakewood Ranch, FL (US)

(73) Assignee: Cobalt Industries Inc., San Francisco, CA (US)

( * ) Notice: Subject to any disclaimer, the term of this patent is extended or adjusted under 35 U.S.C. 154(b) by 0 days.

(21) Appl. No.: 16/777,818

(22) Filed: Jan. 30, 2020

(65) Prior Publication Data
US 2020/0239007 A1 Jul. 30, 2020

Related U.S. Application Data

(60) Provisional application No. 62/798,721, filed on Jan. 30, 2019.

(51) Int. Cl.
*B60W 40/09* (2012.01)
*G05D 1/00* (2006.01)
(Continued)

(52) U.S. Cl.
CPC ............ *B60W 40/09* (2013.01); *B60W 50/16* (2013.01); *B60W 60/0051* (2020.02); *G05D 1/0061* (2013.01); *G05D 1/0088* (2013.01); *G06N 5/04* (2013.01); *G06N 20/00* (2019.01); *B60W 2050/0029* (2013.01); *B60W 2050/0077* (2013.01); *B60W 2050/143* (2013.01); *B60W 2050/146* (2013.01); *B60W 2540/229* (2020.02);
(Continued)

(58) Field of Classification Search
CPC ..................................................... B60W 40/09
See application file for complete search history.

(56) References Cited

U.S. PATENT DOCUMENTS 7,924,146 B2    4/2011   Seder et al.
8,072,686 B2   12/2011   Cui et al.
(Continued)

FOREIGN PATENT DOCUMENTS

DE    102018217634 A1   11/2019
WO      2018211301 A1   11/2018

OTHER PUBLICATIONS

Nitze-Nelson, Dre , "Riding with Empathy. Let's talk about In-Vehicle Sensing", Retrieved from: https://www.inkedin.com/pulse/riding-empathy-lets-talk-in-vehicle-sensing-dr%C3%A9-nitze-nelson, Jan. 2020.

*Primary Examiner* — Alex C Dunn
(74) *Attorney, Agent, or Firm* — Perkins Coie LLP; Brian Coleman

(57) ABSTRACT

A processor associated with a vehicle receives sensor data from a plurality of sensors in the vehicle. Each sensor is configured to measure a different parameter of a driver of the vehicle. The processor applies a model to the received sensor data, which when applied causes the processor to output a determination, based on the parameters of the driver, of attentiveness of the driver to driving the vehicle. Responsive to the determination indicating the driver is not attentive to driving the vehicle, the processor causes the vehicle to output an alert to the driver or to automatically control a driving function of the vehicle.

20 Claims, 4 Drawing Sheets

(51) Int. Cl.
  *B60W 50/16* (2020.01)
  *G06N 20/00* (2019.01)
  *G06N 5/04* (2006.01)
  *B60W 60/00* (2020.01)
  *G05D 1/02* (2020.01)
  *B60W 50/00* (2006.01)
  *B60W 50/14* (2020.01)

(52) U.S. Cl.
  CPC ..... *B60W 2556/10* (2020.02); *B60W 2720/10* (2013.01); *G05D 1/0276* (2013.01); *G05D 2201/0213* (2013.01)

(56) References Cited

U.S. PATENT DOCUMENTS

| | | |
|---|---|---|
| 8,269,652 B2 | 9/2012 | Seder et al. |
| 8,317,329 B2 | 11/2012 | Seder et al. |
| 8,330,673 B2 | 12/2012 | Cui et al. |
| 8,344,894 B2 | 1/2013 | Szczerba et al. |
| 8,350,724 B2 | 1/2013 | Szczerba et al. |
| 8,358,224 B2 | 1/2013 | Seder et al. |
| 8,384,531 B2 | 2/2013 | Szczerba et al. |
| 8,384,532 B2 | 2/2013 | Szczerba et al. |
| 8,395,529 B2 | 3/2013 | Seder et al. |
| 8,427,395 B2 | 4/2013 | Seder et al. |
| 8,482,486 B2 | 7/2013 | Seder et al. |
| 8,547,298 B2 | 10/2013 | Szczerba et al. |
| 8,564,502 B2 | 10/2013 | Cui et al. |
| 8,629,784 B2 | 1/2014 | Szczerba et al. |
| 8,629,903 B2 | 1/2014 | Seder et al. |
| 8,704,653 B2 | 4/2014 | Seder et al. |
| 8,775,063 B2 | 7/2014 | Zeng |
| 8,817,090 B2 | 8/2014 | Szczerba et al. |
| 8,830,141 B2 | 9/2014 | Seder et al. |
| 8,912,978 B2 | 12/2014 | Szczerba et al. |
| 9,162,622 B2 | 10/2015 | Szczerba et al. |
| 9,988,055 B1 | 6/2018 | O'flaherty et al. |
| 10,525,850 B1 | 1/2020 | Tang et al. |
| 10,599,144 B2 | 3/2020 | Zheng et al. |
| 2005/0125117 A1 | 6/2005 | Breed |
| 2006/0149428 A1 | 7/2006 | Kim et al. |
| 2007/0124027 A1 | 5/2007 | Betzitza et al. |
| 2008/0119994 A1* | 5/2008 | Kameyama ........... B60W 40/08 701/48 |
| 2010/0134302 A1 | 6/2010 | Ahn et al. |
| 2010/0253542 A1 | 10/2010 | Seder et al. |
| 2011/0224875 A1 | 9/2011 | Cuddihy et al. |
| 2014/0188920 A1 | 7/2014 | Sharma et al. |
| 2014/0309893 A1 | 10/2014 | Ricci |
| 2015/0091740 A1 | 4/2015 | Bai et al. |
| 2015/0243172 A1 | 8/2015 | Eskilson |
| 2015/0360608 A1 | 12/2015 | Tzirkel-Hancock et al. |
| 2015/0363986 A1 | 12/2015 | Hoyos et al. |
| 2016/0001781 A1 | 1/2016 | Fung et al. |
| 2017/0139411 A1 | 5/2017 | Hartung et al. |
| 2017/0200449 A1 | 7/2017 | Penilla et al. |
| 2017/0247000 A1* | 8/2017 | Ricci ..................... B60R 16/037 |
| 2017/0318044 A1 | 11/2017 | Dagmi et al. |
| 2017/0370732 A1 | 12/2017 | Bender et al. |
| 2018/0034656 A1* | 2/2018 | Balasubramanian ........................ H04L 12/2807 |
| 2018/0050696 A1 | 2/2018 | Misu et al. |
| 2018/0118218 A1 | 5/2018 | Miloser |
| 2018/0174457 A1 | 6/2018 | Taylor |
| 2018/0178808 A1 | 6/2018 | Zhao et al. |
| 2018/0182185 A1 | 6/2018 | Tong et al. |
| 2018/0241852 A1 | 8/2018 | Maluf et al. |
| 2018/0248766 A1 | 8/2018 | Ezra et al. |
| 2018/0268567 A1 | 9/2018 | Hart et al. |
| 2018/0364966 A1 | 12/2018 | Valeri et al. |
| 2019/0028766 A1 | 1/2019 | Wold et al. |
| 2019/0049957 A1 | 2/2019 | Healey et al. |
| 2019/0073547 A1 | 3/2019 | El Kaliouby et al. |
| 2019/0213429 A1 | 7/2019 | Sicconi et al. |
| 2019/0219413 A1* | 7/2019 | Prakah-Asante ........................... G01C 21/3697 |
| 2019/0232974 A1 | 8/2019 | Reiley et al. |
| 2019/0265712 A1* | 8/2019 | Satzoda ................ B60W 40/09 |
| 2020/0036592 A1* | 1/2020 | Kholaif ............... H04L 41/0886 |
| 2020/0039520 A1* | 2/2020 | Misu .................... G05D 1/0088 |
| 2020/0039521 A1* | 2/2020 | Misu ..................... G06N 5/003 |
| 2020/0073478 A1 | 3/2020 | An et al. |
| 2020/0079385 A1* | 3/2020 | Beaurepaire .......... B60W 50/00 |
| 2020/0110461 A1 | 4/2020 | Trim et al. |

* cited by examiner

SYSTEMS AND METHODS FOR VERIFYING AND MONITORING DRIVER PHYSICAL ATTENTION

CROSS-REFERENCE TO RELATED APPLICATION

This application claims the benefit of U.S. Provisional Patent Application No. 62/798,721, filed Jan. 30, 2019, which is incorporated herein by reference in its entirety.

TECHNICAL FIELD

This disclosure relates to verifying and monitoring physical attention of a driver of a vehicle.

BACKGROUND

One key challenge facing the proliferation of self-driving vehicles (e.g., the transition from level 2 to level 5 cars) is the requirement that drivers continually pay attention to the road, traffic, and their surroundings even when the vehicle is in autonomous mode. Drivers can easily spoof current systems for verifying and monitoring passenger physical attention as they today rely predominantly on pressure and other sensors in the steering wheel. For example, drivers can simply place a water bottle or other object on the steering wheel to indicate to the attention-monitoring system that they are "paying attention." This lack of attention can lead to safety hazards ranging from trivial to catastrophic and potentially fatal.

Accordingly, there is a need for improved systems and methods for verifying and monitoring car passenger physical attention that are not easily spoofed.

DETAILED DESCRIPTION

A vehicle monitors whether a driver is attentive to driving the vehicle and causes outputs to rectify driver inattentiveness. In some embodiments, the vehicle includes multiple sensors each configured to measure a different parameter of a driver of the vehicle. A processor is coupled to the sensors to receive data from the sensors. A non-transitory computer readable storage medium stores executable instructions that, when executed, cause the processor to apply a model to the data received from the sensors. When the model is applied by the processor, the processor outputs a determination, based on the parameters of the driver, of whether the driver is attentive to driving the vehicle. Responsive to a determination indicating that the driver is not attentive, the processor can output an alert to the driver.

In other embodiments, a processor associated with a vehicle receives sensor data from a plurality of sensors in the vehicle, where each sensor is configured to measure a different parameter of a driver of the vehicle. The processor applies a model to the received sensor data that causes the processor to output a determination, based on the parameters of the driver, of attentiveness of the driver to driving the vehicle. Responsive to the determination indicating the driver is not attentive, the processor causes the vehicle to automatically control a driving function of the vehicle.

Figure 1:
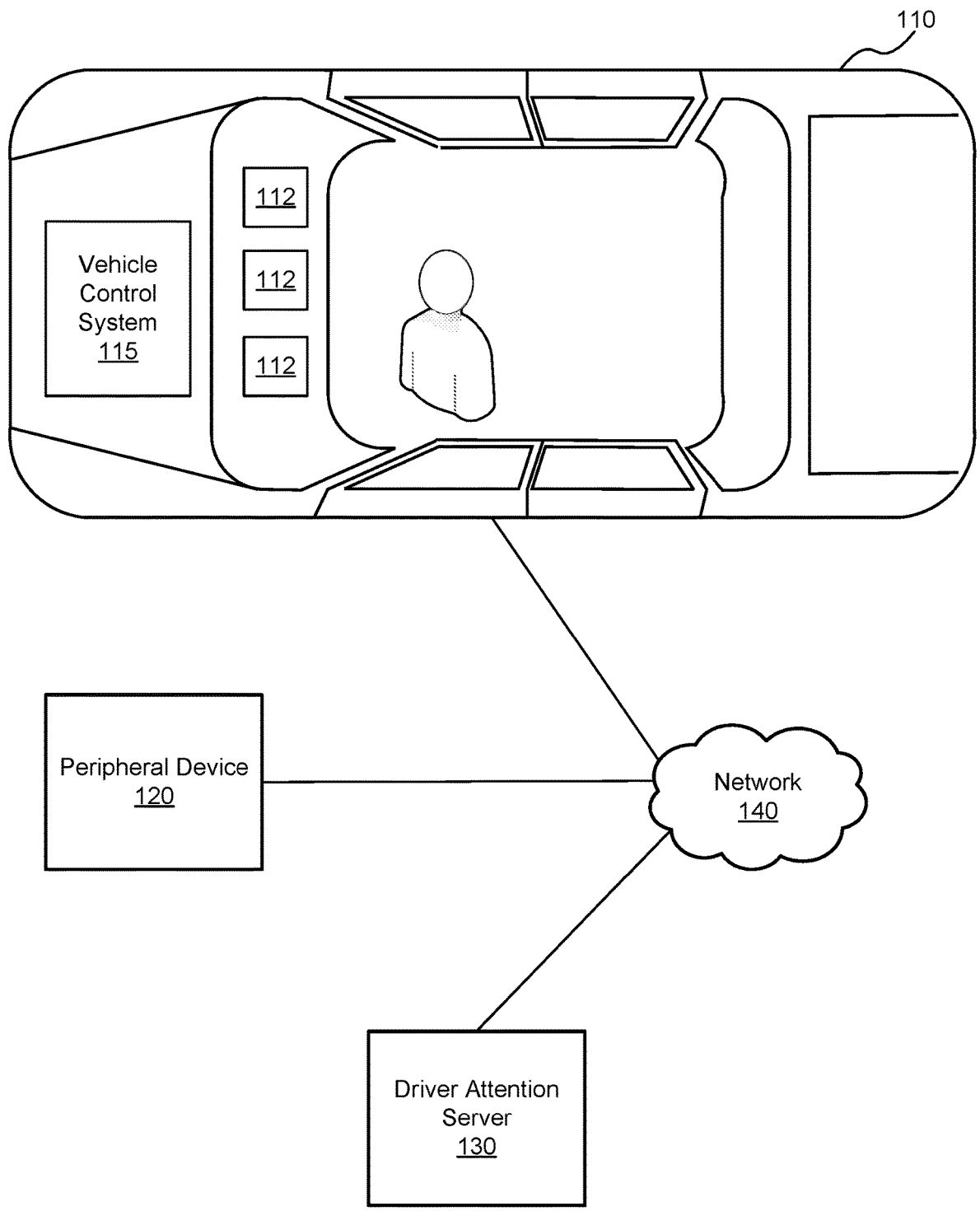
FIG. 1 is a block diagram illustrating an environment in which a vehicle operates, according to some embodiments.

FIG. 1 is a block diagram illustrating an environment 100 in which a vehicle operates. As shown in FIG. 1, the environment 100 can include a vehicle 110, a peripheral device 120, and a driver attention server 130. Communications between the vehicle 110, peripheral device 120, and driver attention server 130 can, in some embodiments, be enabled by a network 140. Other embodiments of the environment 100 can include different or additional systems or components than shown in FIG. 1.

The vehicle 110 according to embodiments described herein can be any automotive vehicle, including any vehicle body type (such as cars, trucks, or buses), engine type (such as internal combustion, hybrid, or electric), or driving mode (such as fully manual (human-operated) vehicles, self-driving vehicles, or hybrid-mode vehicles that can switch between manual and self-driving modes). As shown in FIG. 1, the vehicle 100 can include a plurality of sensors 112 and a vehicle control system 115. The vehicle 100 can include other components not shown in FIG. 1, such as conventional components enabling the vehicle to drive (including an engine, wheels, a steering system, braking and acceleration systems, and the like).

The sensors 112 each measure a parameter associated with a driver of the vehicle. The measured parameter can be any parameter related to the driver's state of attentiveness, including parameters that describe a position of at least a portion of the driver's body in the vehicle, parameters that quantify or qualify an expression on the driver's face, or parameters that measure a direction or rate of change of direction of the driver's gaze. Accordingly, the sensors 112 can include cameras, force sensors in a steering wheel or seat, touch sensors in the steering wheel or other components, or any other type of sensor that can output information relevant for determining the driver parameters. In some cases, the sensors 112 can be coupled to processing modules to process raw sensor data into the parameters of the driver. For example, a camera can be coupled to an eye tracking module that processes image data captured by the camera to track a direction of the driver's gaze, as well as to a facial coding module that processes the image data to determine the driver's facial expression.

The vehicle control system 115 interfaces with various components of the vehicle 110 and controls functionality of the vehicle. The vehicle control system 115 can include an input interface communicatively coupled to the sensors 112 and an output interface communicatively coupled to controllable components of the vehicle. In some embodiments, the input and output interfaces of the vehicle control system 115 are coupled to a vehicle network in the vehicle 100, such as a controller area network (CAN) bus, a local interconnect network (LIN), or a comfort-CAN bus. Electronic equipment in the vehicle 100 can be electronically coupled to the vehicle network and communicate over the network.

The vehicle control system 115 can include computer software and hardware to execute the software, special-purpose hardware, or other components or combinations of components to implement the functionality of the vehicle control system 115 described herein. For example, functionality of the vehicle control system 115 can be implemented in programmable circuitry (e.g., one or more microprocessors), programmed with software and/or firmware, implemented entirely in special-purpose hardwired (i.e., non-programmable circuitry), or enabled by a combination of such forms. Special-purpose circuitry can be in the form of, for example, one or more application-specific integrated circuits (ASICs), programmable logic devices (PLDs), field-programmable gate arrays (FPGAs), etc. In some cases, the vehicle control system 115 includes one or more processors, such as a central processing unit (CPU), graphical processing unit (GPU), or neural processing unit (NPU), that executes instructions stored in a non-transitory computer readable storage medium, such as a memory.

In some embodiments, the vehicle control system 115 outputs control signals to operate the vehicle 110 in a self-driving mode under at least some driving conditions. As used herein, a "self-driving" mode is a mode in which the vehicle control system 115 operates at least one driving function of the vehicle in response to real-time feedback of conditions external to the vehicle 110 and measured automatically by the vehicle control system 115. The driving functions can include any aspects related to control and operation of the vehicle, such as speed control, direction control, or lane positioning of the vehicle 110. For example, the vehicle control system 115 can activate a lane assist function to maintain a lateral position of the vehicle 110 in a lane or an adaptive cruise control function to maintain a speed of the vehicle 110 relative to surrounding vehicle. To control the driving functions, the vehicle control system 115 can receive real-time feedback from external sensors associated with the vehicle 110, such as sensors capturing image data of an environment around the vehicle 110. The vehicle control system 115 can process the sensor data to, for example, identify positions and/or speeds of other vehicles proximate to the vehicle 110, track lane markers, identify non-vehicular entities on the road such as pedestrians or road obstructions, or interpret street signs or lights.

In some cases, the vehicle control system 115 operates the vehicle in an autonomous mode under some driving circumstances, such that the driver does not need to control any driving functions during the autonomous operation. For example, the vehicle control system 115 may enable the driver to engage the autonomous mode when traveling on a freeway. If the driver engages the autonomous mode, the vehicle control system 115 operates the vehicle 110 without input from the driver, based on real-time external feedback, until either the driver disengages the autonomous mode or satisfaction of a triggering condition causes the vehicle control system 115 to disengage the autonomous mode. Example triggering conditions include a change in the driving circumstances (e.g., exiting from a freeway to drive on neighborhood streets) or a determination that the attentiveness of the driver has fallen below a specified threshold.

In other cases, the vehicle control system 115 controls one or more driving functions while the driver concurrently controls one or more other driving functions. For example, the vehicle control system 115 may control a lane assist function, maintaining a lateral position of the vehicle 110 in a marked lane on a road, while the driver controls the speed of the vehicle. This partially autonomous self-driving mode may be active whenever the vehicle is operated, or may be engaged at some times and disengaged at other times. In some cases, the vehicle control system 115 can engage or disengage the partially autonomous mode in response to explicit selections of the driver. In other cases, the vehicle control system 115 may engage or disengage the partially autonomous mode upon satisfaction of a triggering condition. For example, if the attentiveness of the driver falls below a specified threshold while the vehicle is operated in a fully manual mode, the vehicle control system 115 can engage the partially autonomous self-driving mode. The partially autonomous mode may be engaged for a predetermined amount of time or until another triggering condition is satisfied. For example, if the below-threshold attentiveness of the driver triggered the vehicle control system 115 to engage the partially autonomous mode, the vehicle control system 115 can disengage the partially autonomous mode when the driver's attentiveness is determined to be above the threshold again.

The vehicle control system 115 can furthermore generate or receive a determination of the driver's state of attention and cause an output based on the determined state. The driver's state of attention can be determined based on application of a model to a plurality of parameters of the driver. If the driver's state of attentiveness is determined to satisfy a criterion, the vehicle control system 115 can cause the vehicle output. In some circumstances, the vehicle output can be an alert to notify the driver to refocus. In other circumstances, the vehicle output can be a control signal that causes the vehicle to automatically perform at least one driving function. Portions of the processing of the driver parameters to determine the driver's attentiveness can be performed by the vehicle control system 115, or some or all of the processing can be performed by the driver attention server 130.

The peripheral device 120 is a user device including, for example, a mobile device, smart phone, general purpose computer, tablet computer, laptop computer, telephone, PSTN landline, wearable device such as smart glasses or a smart watch, or a voice command device. The peripheral device 120 can be, for example, a device that the driver brings into the vehicle when driving but that is not integrated into the vehicle. In some cases, the peripheral device 120 can output information indicative of the driver's use of the peripheral device 120 while operating the vehicle 110. For example, if the peripheral device 120 is a mobile phone, the mobile phone may output information to the vehicle control system 115 and/or the driver attention server 130 indicating when the driver interacts with the mobile phone. Furthermore, in some cases, the peripheral device 120 can receive communications from the vehicle control system 115 and/or the driver attention server 130 and output information to the driver based on the communications. For example, if the driver attention server 130 determines the driver is not attentive, the driver attention server 130 or vehicle control system 115 can cause the peripheral device 120 to output an alert to the driver.

The driver attention server 130 receives data indicative of a plurality of parameters of the driver and determines the driver's state of attention based on the plurality of parameters. The driver attention server 130 is described further with respect to FIG. 2.

The network 140 enables communications between the vehicle 110, peripheral device 120, and driver attention server 130, and can include any of a variety of individual connections via the internet such as cellular or other wireless networks, such as 4G networks, 5G networks, or WiFi. In some embodiments, the network 140 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 140 may comprise any type of computer networking arrangement used to exchange data. For example, the network 140 may be the Internet, a private data network, virtual private network using a public network, and/or other suitable connection(s) that enables components in system environment 100 to send and receive information between the components of system environment 100. The network 140 may also include a public switched telephone network ("PSTN") and/or a wireless network.

Figure 2:
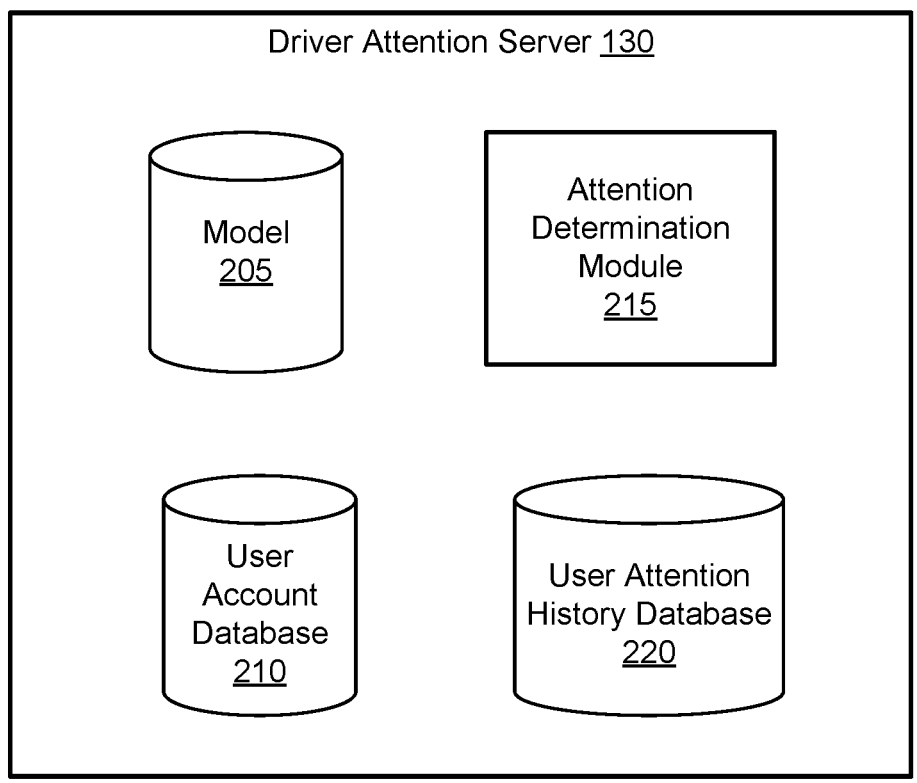
FIG. 2 is a block diagram illustrating functional modules executed by a driver attention server, according to some embodiments.

FIG. 2 is a block diagram illustrating functional modules executed by the driver attention server 130, according to some embodiments. In some embodiments, the driver attention server 130 executes an attention determination module 215 and stores a model 205, a user account database 210, and a user attention history database 220. The modules can comprise software (e.g., computer-readable instructions executable by a processor of the driver attention server 130), hardware (e.g., one or more ASICs or other special-purpose circuitry), or a combination of software and hardware. Other embodiments of the driver attention server 130 can execute additional, fewer, or different modules, and the functionality can be distributed differently between the modules. For example, at least a portion of the functions described below as being performed by the driver attention server 130 can instead be performed by the vehicle control system 115 on the vehicle 110.

As shown in FIG. 2, the driver attention server 130 can maintain a model 205. When applied to parameters of the driver (represented by sensor data generated by the sensors 112 and/or data received from the peripheral device 120), the model 205 can cause a determination of a state of the driver's attentiveness. The model 205 can include, in some embodiments, one or more rules or mathematical or statistical relationships that can cause the driver attention server 130 to determine the driver's state of attentiveness based on sensor data received from the sensors 112 in the vehicle 110. In some cases, the model 205 can include rules specifying ranges and combinations of driver parameters that, if satisfied, will cause the driver attention server 130 to output a specified determination of the driver's state of attentiveness. The rules may each take multiple parameters of the driver as inputs. For example, a rule may specify that a driver will be determined to be inattentive if (a) the driver's gaze is determined to be pointing a direction other than towards the road for a threshold amount of time and (b) skeletal tracking indicates that the driver is facing forward (e.g., not turning to check a blind spot). Some rules may additionally or alternatively receive data from the peripheral device 120 as an input. For example, a rule may specify that the driver will be determined to be highly inattentive if (a) data from the peripheral device 120, such as a mobile phone, indicates that the driver is currently using the mobile phone, and (b) the driver's gaze is pointing away from the road towards the mobile phone.

In other cases, the model 205 includes a trained machine learning model, where the model 205 is represented, for example, as an artifact of weights and biases resulting from the training of the model. In some embodiments, the driver attention server 130 trains the model 205 using aggregated attentiveness data from many drivers. For example, the driver attention server 130 can use aggregated data sets that each include multiple parameters of drivers collected over various periods of time and labeled according to a level of attention of the driver at the time the parameters were measured. The training data can be labeled with two or more labels. For example, in some cases, the training data can be labeled with a binary determination of attentiveness: either "attentive" or "inattentive." In other cases, the training data can be labeled with additional levels of attentiveness, such as "attentive," "moderately inattentive," and "severely inattentive." Any number of labels can be used. When trained with the labeled training data, the model 205 can be applied to parameters of a driver and output the level of attention of the driver.

In some embodiments, the training data sets further include information about the driver or the vehicle, such as a type of vehicle (e.g., pickup truck or mid-sized sedan), make or model of vehicle, demographic information about the driver (e.g., age, gender, or height), or geographic location of the driver. The information about the driver or vehicle can be stored in a user profile associated with the driver and retrieved to associate with the driver's attention data in the training set. The model can be trained using these rich data sets, enabling the possible extraction of additional features to improve the model's accuracy in determining the driver's level of attentiveness. For example, the training may result in a determination that drivers in one type of vehicle exhibit different parameters when distracted than drivers in another type of vehicle because, for example, a height of the vehicle changes the directions of the driver's gaze.

Some embodiments of the model 205 can be retrained based on parameters of a particular driver, thus personalizing the model to the driver. In this case, the driver attention server 130 may continuously or periodically receive data indicating parameters of the driver and use the parameters to update the model for application to subsequent measurements of the driver's parameters. In some cases, the parameters of the driver used to retrain the model can be associated with an identifier of the determination made about the driver's state of attention at the time the parameters were collected, as well as information indicating whether the determination was correct to refine the ability of the model 205 to accurately characterize the driver's attentiveness. For example, if the attention determination module 215 determines that the driver is inattentive based on a set of parameters and causes the vehicle to output an alert in response, the attention determination module 215 can measure parameters after the alert was output to determine if the driver's level of attention changed. If the driver's attentiveness increases after the alert, the attention determination module 215 can output a confirmation that the driver was distracted previously and the model's determination was correct. If the driver's attentiveness does not change, the attention determination module 215 may conclude that the driver was not distracted.

Any of a variety of other machine learning, deep learning, statistical modeling, or artificial intelligence techniques can be used to determine the driver's attentiveness based on the parameters.

The user account database 210 can store data related to user accounts, such as user identification information (e.g., name, age, sex, birthday, address, VIP status, key user status, preferences, preferred language, vehicle(s) owned, greeting name, channel, talking points (e.g., favorite sports team), or geographic region of residence), account numbers, authorized users associated with one or more accounts, login credentials, or known biometric data associated with the user.

The attention determination module 215 applies the model 205 to data indicative of parameters of the driver and outputs a determination of the state of attentiveness of the driver.

The user attention history database 220 can record the determinations about the driver's state of attentiveness. In some cases, each determination of the driver's state of attentiveness can be stored with information about the parameters of the driver that led to the determination. Metadata associated with the determination can also be stored in the user attention history database 220, such as a time of day the determination was made, the geographic location of the vehicle, the type of road on which the vehicle was traveling (e.g., freeway or neighborhood street), or weather conditions at the vehicle's location at the time of determination. Furthermore, in some cases, some determinations of the driver's state of attentiveness can be stored with information indicating whether the determination was correct. The accuracy of a determination can be determined by, for example, measuring whether the driver's attentiveness increased after outputting an alert, or by asking the driver for confirmation that they were attentive or inattentive at a given time. In some cases, the data stored in the user attention history database 220 can be used to improve the model 205. For example, the model 205 may be periodically or continuously retrained using the data stored in the user attention history database 220 to continually improve the accuracy of the model, as described above.

The user attention history database 220 can store data for multiple users, such as any driver with a profile on the driver attention server 130. The data can be anonymized for privacy prior to storage in the database 220. Alternatively, there may be different user attention history databases 220 for different drivers. For example, the vehicle 100 may maintain a local user attention history database for the driver of the vehicle rather than (or in addition to) sending the data to the driver attention server 130. In some cases, whether a driver's data is transmitted to the driver attention server 130 and aggregated in the user attention history database 220 can depend on a privacy setting applied by the driver. For example, if a driver has a high privacy setting, the data is maintained only locally on the vehicle 100, while data for a driver with a low privacy setting is transmitted to the driver attention server 130.

Figure 3:
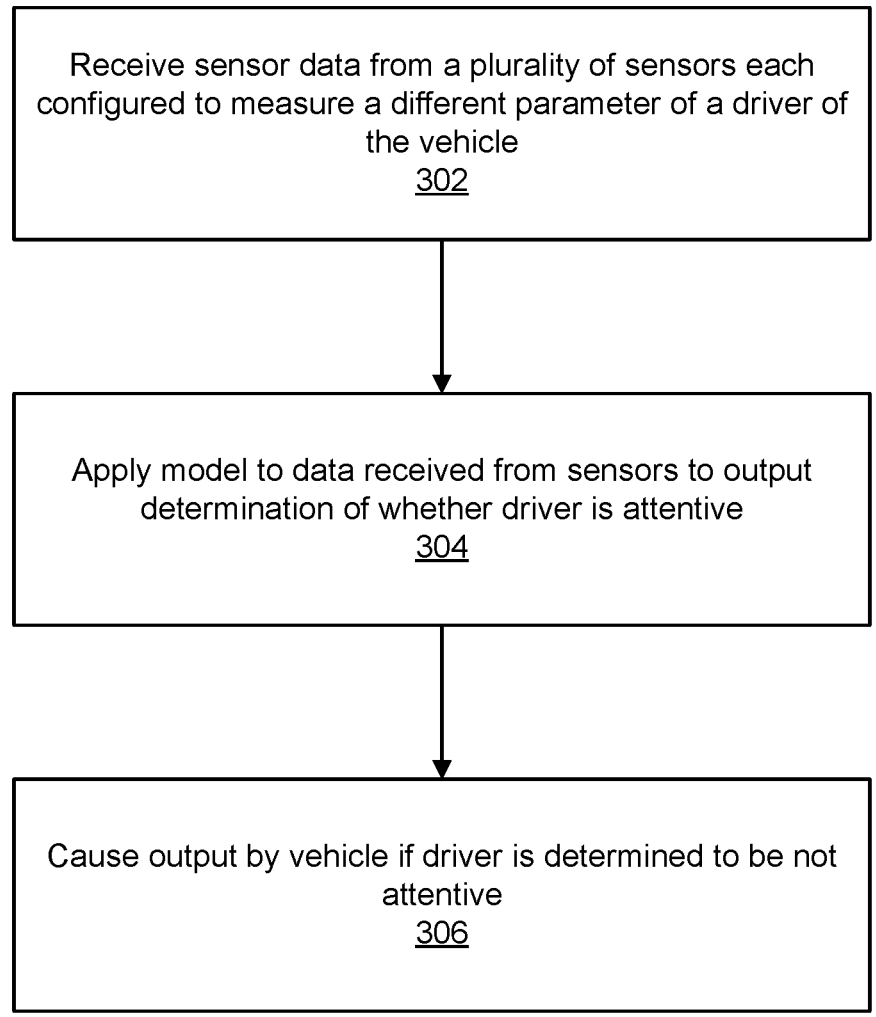
FIG. 3 is a flowchart illustrating an example process for determining whether a driver is attentive to driving a vehicle, according to some embodiments.

FIG. 3 is a flowchart illustrating an example process for determining whether a driver is attentive to driving a vehicle, according to some embodiments. The process shown in FIG. 3 can be performed by the driver attention server 130. In other embodiments, the process can be performed by components of the vehicle 110, such as the vehicle control system 115, or some steps of the process can be performed by the driver attention server 130 while others are performed by the vehicle control system 115. Furthermore, other embodiments of the process can include additional, fewer, or different steps, and the steps can be performed in different orders.

As shown in FIG. 3, the driver attention server 130 receives, at step 302, sensor data from a plurality of sensors in a vehicle. Each sensor is configured to measure a different parameter of a driver of the vehicle. The sensor data received by the driver attention server 130 may be pre-processed by the vehicle control system 115, such as sampled, normalized, or filtered. In some embodiments, the driver attention server 130 receives a continuous stream of the sensor data as the driver is operating the vehicle. In other embodiments, the sensor data may be transmitted to the driver attention server 130 when the vehicle is operated in a designated mode. For example, the vehicle control system 115 may collect and transmit the sensor data when the vehicle is operated in a self-driving mode, but not when the vehicle is operated in a manual driving mode. Alternatively, the vehicle control system 115 may collect and transmit the sensor data when the vehicle is operated in a manual mode, but not when the vehicle is operated in a self-driving mode.

At step 304, the driver attention server 130 applies a model to the received sensor data. When applied to the parameters of the driver, the model outputs a determination of whether the driver is attentive to driving the vehicle. In some embodiments, the model includes one or more rules that cause the driver attention server 130 to determine the driver is not attentive if the received sensor data satisfies a condition in the rules. In other embodiments, the model is a trained machine learning model that receives the parameters of the driver as inputs and causes the driver attention server 130 to output the attentiveness of the driver. The model can be trained using data aggregated from multiple users, data aggregated from the same driver over time, or a combination of such data.

At step 306, the driver attention server 130 causes an output by the vehicle if the driver is determined to be not attentive based on the application of the model in step 304. In some embodiments, the vehicle output can be an alert that notifies the driver to re-engage. The alert can include any of a variety of audible, visible, or tangible signals output to the driver. For example, the alert can include an audio recording of a sound (such as a beep or siren sound) or a spoken message (such as, "Please stay alert"). As another example, the alert can include a visible signal such as a flashing light or a message displayed on an infotainment system display, a head-up display, or another display device in the vehicle. The alert can additionally or alternatively include a tangible signal, such as a vibration in the steering wheel or the driver's seat.

In other embodiments, the vehicle output caused by the driver attention server 130 comprises an output to control a driving function. For example, the driver attention server 130 can cause the vehicle to activate a lane assist function or an adaptive cruise control function. Alternatively, the driver attention server 130 can cause the vehicle to activate a fully autonomous driving mode upon determining the driver is inattentive.

The driver attention server 130 can, in some embodiments, output a determination of the driver's state of attention as a binary classification (e.g., either attentive or inattentive), and the vehicle output is caused in response to the driver's state being classified as inattentive. In other embodiments, the driver attention server 130 outputs a determination of a degree of the driver's inattentiveness and the vehicle output is selected based on the degree of inattentiveness. For example, the driver attention server 130 may output a determination, based on application of the model to the driver parameters, that classifies the driver's state of attention into three categories: attentive, mildly inattentive, or severely inattentive. If the driver's state of attention is determined to be mildly inattentive, the vehicle may output an alert that notifies the driver to re-engage. If the driver's state of attention is determined to be severely inattentive, the vehicle may output control signals to control one or more driving functions of the vehicle. The driver's state of attention may be classified into more categories than three, and the categories may correspond to different levels or types of attentiveness.

In other embodiments, the vehicle output can be selected based on an amount of time the driver is inattentive. For example, if the driver is determined to be inattentive for an amount of time that exceeds first threshold (such as three seconds), the vehicle can output an alert to notify the driver to re-engage. If the driver is determined to be inattentive for an amount of time that exceeds a second threshold (such as ten seconds), the vehicle can output control signals to control one or more driving functions.

Figure 4:
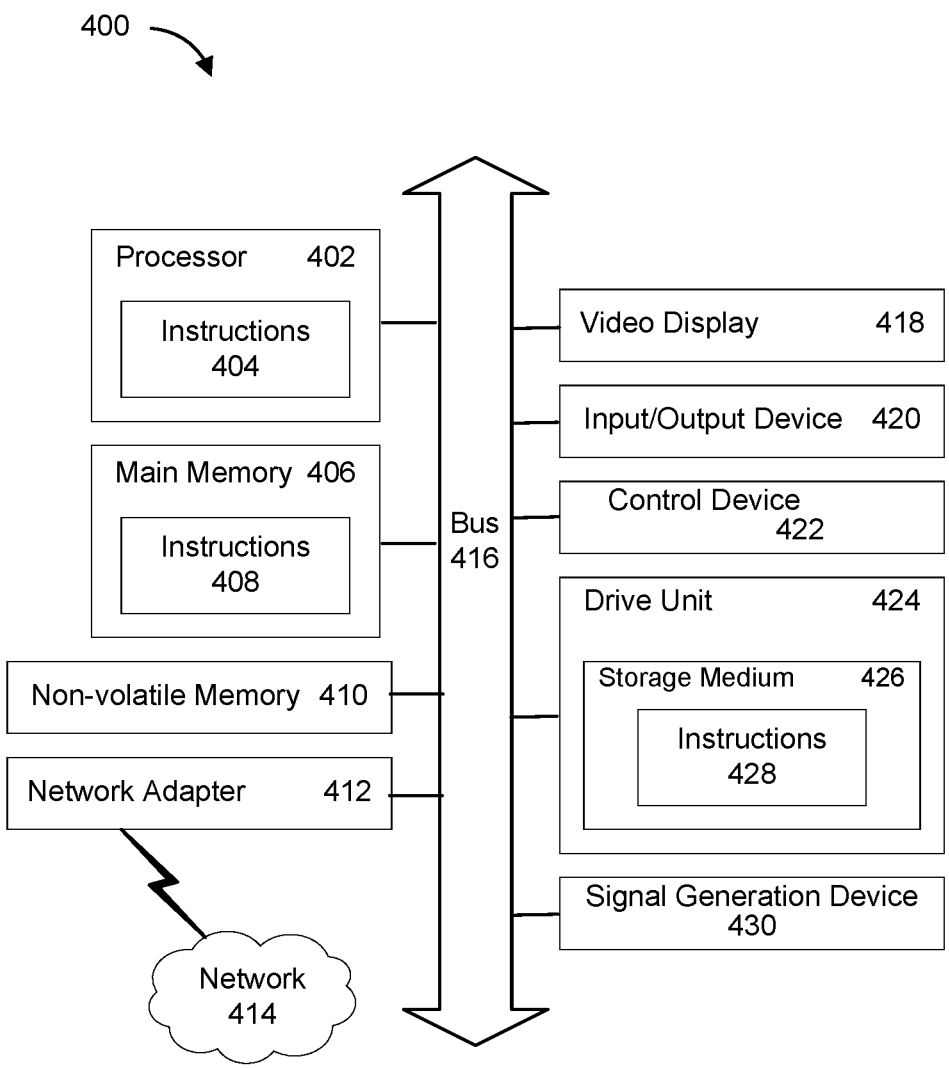
FIG. 4 is a block diagram illustrating an example of a processing system.

FIG. 4 is a block diagram illustrating an example of a processing system 400 in which at least some operations described herein can be implemented. For example, the driver attention server 130 may be implemented as the example processing system 400, and the vehicle 110 may include at least some components of the processing system 400. The processing system 400 may include one or more central processing units ("processors") 402, main memory 406, non-volatile memory 410, network adapter 412 (e.g., network interfaces), video display 418, input/output devices 420, control device 422 (e.g., keyboard and pointing devices), drive unit 424 including a storage medium 426, and signal generation device 430 that are communicatively connected to a bus 416. The bus 416 is illustrated as an abstraction that represents any one or more separate physical buses, point to point connections, or both connected by appropriate bridges, adapters, or controllers. The bus 416, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 494 bus, also called "Firewire."

In various embodiments, the processing system 400 operates as part of a user device, although the processing system 400 may also be connected (e.g., wired or wirelessly) to the user device. In a networked deployment, the processing system 400 may operate in the capacity of a server or a client machine in a client-server network environment, or as a peer machine in a peer-to-peer (or distributed) network environment.

The processing system 400 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 400.

While the main memory 406, non-volatile memory 410, and storage medium 426 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 428. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 404, 408, 428) set at various times in various memory and storage devices in a computer, and that, when read and executed by one or more processing units or processors 402, cause the processing system 400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 410, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 412 enables the processing system 400 to mediate data in a network 414 with an entity that is external to the processing system 400 through any known and/or convenient communications protocol supported by the processing system 400 and the external entity. The network adapter 412 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 412 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method comprising:
   receiving at a processor associated with a vehicle, sensor data from a plurality of sensors in the vehicle, each sensor configured to measure a different parameter of a driver of the vehicle;
   applying, by the processor, a model to the received sensor data, the model when applied to the received sensor data causing the processor to output a determination, based on the parameters of the driver, of attentiveness of the driver to driving the vehicle;
   using the determined attentiveness of the driver, detecting, by the processor, a change by the driver from an attentive state to an inattentive state while the driver is operating multiple driving functions of the vehicle; and
   responsive to the detected change to the inattentive state, causing, by the processor, the vehicle to automatically control one or more of the multiple driving functions of the vehicle.

2. The method of claim 1, wherein the model includes one or more rules that cause the processor to determine the driver is in the inattentive state if the received sensor data satisfies a condition in the one or more rules.

3. The method of claim 1, wherein the model is a trained machine learning model that receives the parameters of the driver as inputs and causes the processor to output the attentiveness of the driver.

4. The method of claim 3, wherein the machine learning model is periodically retrained using historical data associated with the driver, the historical data including one or more parameters of the driver measured at each of a plurality of times and a determination of the attentiveness of the driver at the corresponding time.

5. The method of claim 1, wherein causing the vehicle to automatically control the one or more driving functions of the vehicle comprises causing the vehicle to control at least one of a speed or a position of the vehicle based on real-time feedback of an environment around the vehicle.

6. The method of claim 1, further comprising causing the vehicle to output an alert to the driver responsive to the detected change to the inattentive state.

7. The method of claim 6, wherein the determination of the attentiveness of the driver is a level of attentiveness selected from a plurality of possible levels of attentiveness, and wherein the processor causes the vehicle to output the alert if the attentiveness of the driver is determined to change from a first level of attentiveness to a second level of attentiveness and causes the vehicle to automatically control the driving function if the attentiveness of the driver is determined to change from the first level of attentiveness to a third level of attentiveness.

8. The method of claim 6, wherein the determination of the attentiveness of the driver includes a determination of an amount of time the driver is in the attentive state or the inattentive state, and wherein the processor causes the vehicle to output the alert if the amount of time the driver is in the inattentive state exceeds a first threshold amount of time and causes the vehicle to automatically control the driving function if the amount of time the driver is in the inattentive state exceeds a second threshold amount of time.

9. A vehicle comprising:
   a plurality of sensors each configured to measure a different parameter of a driver of a vehicle;
   a processor coupled to the plurality of sensors to receive data associated with the parameters of the driver; and
   a non-transitory computer readable storage medium storing executable instructions, the instructions when executed by the processor causing the processor to:
      apply a model to the data received from the plurality of sensors, the model when applied causing the processor to output a determination, based on the parameters of the driver, of whether the driver is attentive to driving the vehicle;
      using the model, detect a change by the driver from an attentive state to an inattentive state while the driver is operating multiple driving functions of the vehicle; and
      responsive to the detected change to the inattentive state, output an alert to the driver.

10. The vehicle of claim 9, further comprising a vehicle control system configured to control one or more driving functions of the vehicle automatically based on real-time feedback of an environment around the vehicle, and wherein the instructions further cause the processor to cause the vehicle control system to control at least one driving function of the vehicle responsive to the determination indicating the driver is in the inattentive state.

11. The vehicle of claim 10, wherein the determination of whether the driver is attentive comprises determining a level of attentiveness selected from a plurality of possible levels of attentiveness, and wherein the processor causes the vehicle to output the alert if the attentiveness of the driver is determined to change from a first level of attentiveness to a second level of attentiveness and causes the vehicle to automatically control the driving function if the attentiveness of the driver is determined to change from the first level of attentiveness to a third level of attentiveness.

12. The vehicle of claim 10, wherein the determination of whether the driver is attentive comprises determining an amount of time the driver is in the attentive state or the inattentive state, and wherein the processor causes the vehicle to output the alert if the amount of time the driver is in the inattentive state exceeds a first threshold amount of time and causes the vehicle to automatically control the driving function if the amount of time the driver is in the inattentive state exceeds a second threshold amount of time.

13. The vehicle of claim 9, wherein the model includes one or more rules that cause the processor to determine the driver is in the inattentive state if the received sensor data satisfies a condition in the one or more rules.

14. The vehicle of claim 9, wherein the model is a trained machine learning model that receives the parameters of the driver as inputs and causes the processor to output the attentiveness of the driver.

15. The vehicle of claim 14, wherein the machine learning model is periodically retrained using historical data associated with the driver, the historical data including one or more parameters of the driver measured at each of a plurality of times and a determination of the attentiveness of the driver at the corresponding time.

16. The vehicle of claim 9, wherein causing the vehicle to automatically control a driving function of the vehicle comprises causing the vehicle to control at least one of a speed or a position of the vehicle based on real-time feedback of an environment around the vehicle.

17. The vehicle of claim 9, wherein the alert comprises at least one of an audible signal, a visual signal, or a tactile signal.

18. The vehicle of claim 9, wherein the instructions cause the processor to apply the model to determine whether the driver is attentive to driving the vehicle when the vehicle is operated in a self-driving mode.

19. The vehicle of claim 9, further comprising a car network communicatively coupled to the processor and the plurality of sensors, wherein the sensors output the data associated with the parameters of the driver to the car network and the processor receives the data from the car network.

20. A non-transitory computer readable storage medium storing executable instructions, the instructions when executed by a processor causing the processor to:
- receive sensor data from a plurality of sensors in the vehicle, each sensor configured to measure a different parameter of a driver of the vehicle;
- apply a model to the received sensor data, the model when applied to the received sensor data causing the processor to output a determination, based on the parameters of the driver, of attentiveness of the driver to driving the vehicle;
- using the determined attentiveness of the driver, detect a change by the driver from an attentive state to an inattentive state while the driver is operating multiple driving functions of the vehicle; and
- responsive to the detected change to the inattentive state, cause the vehicle to automatically control one or more of the multiple driving functions of the vehicle.

* * * * *